(12) United States Patent
Borrel et al.

(10) Patent No.: US 10,990,882 B2
(45) Date of Patent: Apr. 27, 2021

(54) STRATIGRAPHIC LAYER IDENTIFICATION FROM SEISMIC AND WELL DATA WITH STRATIGRAPHIC KNOWLEDGE BASE

(71) Applicant: International Business Machines Corporation, Armonk, NY (US)

(72) Inventors: Paul Borrel, Cortlandt Manor, NY (US); Paulo R. Cavalin, Rio de Janeiro (BR); Matthias Kormaksson, Rio de Janeiro (BR); Carmen N. Mena Paz, Rio de Janeiro (BR); Michael Raghib, Balwyn North (AU)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 15/662,411

(22) Filed: Jul. 28, 2017

(65) Prior Publication Data

US 2019/0034812 A1    Jan. 31, 2019

(51) Int. Cl.
*G06N 5/04* (2006.01)
*G01V 1/50* (2006.01)
(Continued)

(52) U.S. Cl.
CPC .................. *G06N 5/04* (2013.01); *G01V 1/50* (2013.01); *G01V 99/005* (2013.01); *G06N 20/00* (2019.01); *G01V 2210/66* (2013.01)

(58) Field of Classification Search
CPC ..... G01V 99/005; G01V 1/50; G01V 2210/66
See application file for complete search history.

(56) References Cited

U.S. PATENT DOCUMENTS 5,966,672 A   10/1999  Knupp
6,380,593 B1   4/2002  Maxey et al.
(Continued)

FOREIGN PATENT DOCUMENTS

CA       2764705 A1    12/2010
CN     102053270 A      5/2011
(Continued)

OTHER PUBLICATIONS de Macedo, Isadora Augusta Santana, Carolina Barros da Silva, and José Jadsom Sampaio de Figueiredo. "Comparison of deterministic wavelet estimation and statistic wavelet estimation through predictive deconvolution on the quality of well tie: application on synthetic and real data." (2016). (Year: 2016).*

(Continued)

*Primary Examiner* — Hal Schnee
(74) *Attorney, Agent, or Firm* — Aaron N. Pontikos (57) ABSTRACT

A system, method and program product for stratigraphic layer identification using a stratigraphic knowledge base for machine learning. Reservoir data includes seismic data and well log data for a reservoir area. The well log data is processed to identify well stratigraphic layer features and the seismic data is processed to identify seismic stratigraphic layer features. A feature matching algorithm based on a stratigraphic knowledge base is selected to match the well stratigraphic layer features to the seismic stratigraphic layer features. The matched features are used to define a stratigraphic layer interpretation for the reservoir area and the interpretation is presented to a user.

17 Claims, 5 Drawing Sheets

(51) Int. Cl.
*G01V 99/00* (2009.01)
*G06N 20/00* (2019.01)

(56) References Cited

U.S. PATENT DOCUMENTS

| | | | |
|---|---|---|---|
| 7,433,786 | B2 | 10/2008 | Adams |
| 7,668,042 | B2 | 2/2010 | Robinson |
| 7,873,476 | B2 | 1/2011 | Thorne |
| 8,184,502 | B2 | 5/2012 | Xu et al. |
| 8,694,261 | B1 | 4/2014 | Robinson |
| 8,694,540 | B1 * | 4/2014 | Lin .................. G06F 16/211 707/777 |
| 8,903,659 | B2 | 12/2014 | Van Hoek et al. |
| 2011/0320182 | A1 * | 12/2011 | Dommisse ............. G01V 1/34 703/10 |
| 2012/0029828 | A1 * | 2/2012 | Pepper ................. G01V 1/301 702/16 |
| 2012/0150447 | A1 | 6/2012 | Van Hoek et al. |
| 2014/0222342 | A1 | 8/2014 | Robinson |
| 2015/0003688 | A1 | 1/2015 | Kumar et al. |
| 2015/0081222 | A1 * | 3/2015 | Laing ................... E21B 45/00 702/9 |
| 2016/0341834 | A1 * | 11/2016 | Bartetzko ............... G01V 1/50 |
| 2019/0005089 | A1 * | 1/2019 | Kempf .................. G06F 16/248 |
| 2020/0019882 | A1 * | 1/2020 | Garg ...................... G06F 8/60 |
| 2020/0160173 | A1 * | 5/2020 | Pandey .................. G06N 3/08 |

FOREIGN PATENT DOCUMENTS

| | | |
|---|---|---|
| CN | 105807318 A | 7/2016 |
| EP | 0562696 A2 | 9/1997 |
| GB | 2482645 A | 2/2012 |
| GB | 2506026 A | 3/2014 |
| GB | 2506027 A | 3/2014 |
| WO | 2010142659 A2 | 12/2010 |
| WO | 20190212471 W | 1/2019 |

OTHER PUBLICATIONS

Thomas, Angeleena; "Towards an Effective Automated Interpretation Method for Modem Hydrocarbon Borehole Geophysical Images"; 2012; Thesis for the degree of Doctor of Philosophy in Geophysics by Angeleena Thomas; School of Geosciences; The University of Edinburgh; pp. 200.

Glover, Paul W.J.; The characterization of trough and planar cross-bedding from borehole image logs, Journal of Applied Geophysics 62; 2007; Copyright 2006 Published by Elsevier B.V.; pp. 178-191.

International Search Report and Written Opinion dated Dec. 5, 2018 for PCT/IB2018/055621 filed Jul. 27, 2018; pp. 10.

* cited by examiner

STRATIGRAPHIC LAYER IDENTIFICATION FROM SEISMIC AND WELL DATA WITH STRATIGRAPHIC KNOWLEDGE BASE

TECHNICAL FIELD

The disclosure relates to stratigraphic analysis and modeling, such as is used in petroleum reservoir management, and more particularly to tying well data to seismic data for modeling stratigraphic layers across a seismic volume.

BACKGROUND

Computers are used in most areas of complex data acquisition, expert analysis, and system implementation. This is particularly true in areas of deep domain knowledge, such as the analysis of complex physical systems. For example, the planning, implementation, and maintenance of oil reservoirs may include domain knowledge and related computer systems for analysis of seismic, well-logging, structural geology, reservoir geology, etc.

Well-tie analysis may involve using fine-scale well-log data from one or more wells in an area with much coarser seismic data to model stratigraphic layers between and around the wells. Successful well-tie analysis may allow expert users to calibrate velocity models, increase the quality of sedimentary models, confirm or reject hypotheses about the depositional environment, and establish depth locations of confining reservoir horizons, flooding surfaces, traps, etc. Conventional stratigraphic layer identification may involve generating a synthetic trace from the well-tie and overlaying the trace on consistent features in the seismic image, sometimes with the addition of one or more stratigraphic columns. An expert user may iteratively add wells, establish correlations, and refine interpretations as well-log data is added.

SUMMARY

Aspects of the disclosure provide a system, method and program product for stratigraphic layer identification using a stratigraphic knowledge base for machine learning. Reservoir data includes seismic data and well log data for a reservoir area. The well log data is processed to identify well stratigraphic layer features and the seismic data is processed to identify seismic stratigraphic layer features. A feature matching algorithm based on a stratigraphic knowledge base is selected to match the well stratigraphic layer features to the seismic stratigraphic layer features. The matched features are used to define a stratigraphic layer interpretation for the reservoir area and the interpretation is presented to a user.

A first aspect discloses a stratigraphic layer identification system. A reservoir data source including seismic data for a reservoir area and well log data for at least one well in the reservoir area. A well feature extraction module processes at least a portion of the well log data to identify a plurality of well stratigraphic layer features. A seismic feature extraction module processes at least a portion of the seismic data to identify a plurality of seismic stratigraphic layer features. A feature matching module selects a feature matching algorithm from a plurality of feature matching algorithms based on a stratigraphic knowledge base to match the plurality of well stratigraphic layer features to the plurality of seismic stratigraphic layer features. A layer propagation module uses the plurality of well stratigraphic layer features matched to the plurality of seismic stratigraphic layer features to define a stratigraphic layer interpretation for the reservoir area. An interpretation interface module presents the stratigraphic layer interpretation to a user.

A second aspect discloses a computer program product stored on a computer readable storage medium, which when executed by a computing system, provides stratigraphic layer identification system. Program code accesses seismic data for a reservoir area and well log data for at least one well in the reservoir area. Program code processes at least a portion of the well log data to identify a plurality of well stratigraphic layer features. Program code processes at least a portion of the seismic data to identify a plurality of seismic stratigraphic layer features. Program code selects a feature matching algorithm from a plurality of feature matching algorithms based on a stratigraphic knowledge base to match the plurality of well stratigraphic layer features to the plurality of seismic stratigraphic layer features. Program code uses the plurality of well stratigraphic layer features matched to the plurality of seismic stratigraphic layer features to define a stratigraphic layer interpretation for the reservoir area. Program code presents the stratigraphic layer interpretation to a user.

A third aspect discloses a computerized method. Seismic data for a reservoir area and well log data for at least one well in the reservoir area are accessed. At least a portion of the well log data is processed to identify a plurality of well stratigraphic layer features. At least a portion of the seismic data is processed to identify a plurality of seismic stratigraphic layer features. A feature matching algorithm is selected from a plurality of feature matching algorithms based on a stratigraphic knowledge base. The plurality of well stratigraphic layer features are matched to the plurality of seismic stratigraphic layer features. Stratigraphic layer features are propagated using the plurality of well stratigraphic layer features matched to the plurality of seismic stratigraphic layer features to define a stratigraphic layer interpretation for the reservoir area. The stratigraphic layer interpretation is visualized to a user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
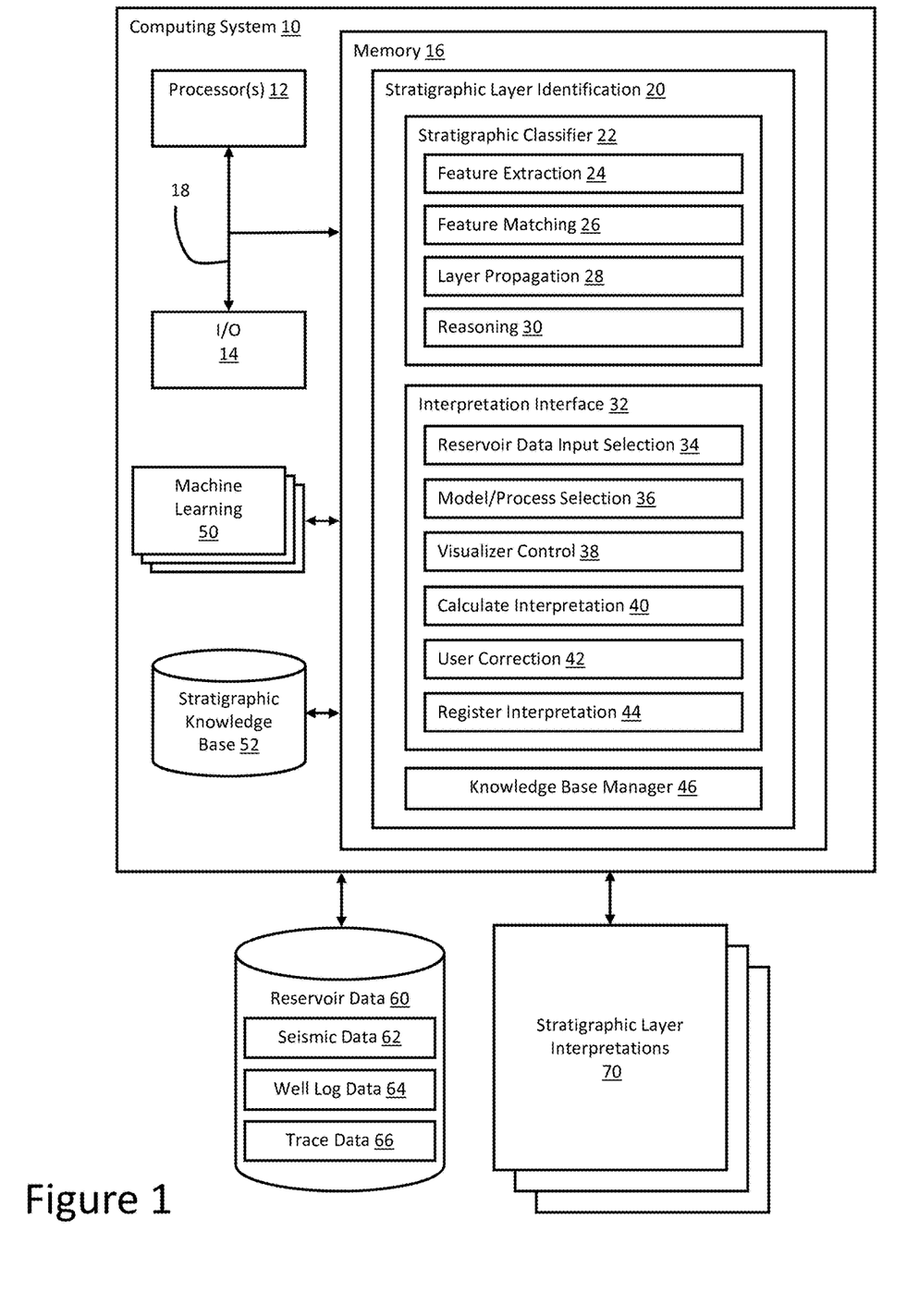
FIG. 1 shows an example stratigraphic layer identification system according to embodiments.

Referring now to the drawings, FIG. 1 depicts a computing system 10 having a stratigraphic layer identification system 20 in communication with a reservoir data source 60 and generating and receiving stratigraphic layer interpretations 70. Computing system 10 may be the computer system of one or more domain experts who use computing system 10 to gather, manage, analyze, and report on stratigraphic layer interpretations 70 for reservoir management projects. For example, reservoir data source 60 may include one or more local or network accessed data repositories for seismic data 62, well log data 64, trace data 66, and other field and simulation data related to a particular reservoir of interest that is accessed by the user through computing system 10. Stratigraphic layer interpretations 70 may be an output of computing system 10 and may also be received by computing system 10 for storage, analysis, updating, and/or addition to stratigraphic knowledge base 52. A stratigraphic layer interpretation may be defined as a visual map and/or underlying data describing and defining the locations of a plurality of horizons between adjacent strata having different characteristics within a geological volume or a slice or portion thereof. Stratigraphic layers may also be referred to as bed boundaries, florets boundaries, beddings planes, or beddings boundaries.

In some embodiments, stratigraphic layer identification system 20 includes a stratigraphic classifier 22, an interpretation interface 32, and a knowledge base manager 46. For example, stratigraphic classifier 22, an interpretation interface 32, and a knowledge base manager 46 may be features or functions of a computer application program for stratigraphic layer interpretation. Stratigraphic classifier 22 may use machine learning algorithms 50 and stratigraphic knowledge base 52 to automatically generate one or more stratigraphic layer interpretations for evaluation and/or modification by the user. Interpretation interface 32 may present the stratigraphic layer interpretations to the user and otherwise enable user control of the inputs, modification, and selection of an interpretation. Knowledge base manager 46 may enable the addition and modification of information in stratigraphic knowledge base 52 and/or the available machine learning algorithms 50 and their application to stratigraphic knowledge base 52.

In some embodiments, stratigraphic classifier 22 may include feature extraction 24, feature matching 26, layer propagation 28, and reasoning module 30. Feature extraction 24 may include a plurality of image processing algorithms for identifying features within seismic and/or well log images that may be relevant to differentiating strata and horizons between them. For example, layers in well log images in well log data 64 can be delimited by means of spike detection in well ties, combined with image processing techniques, such as Hough transform and/or pixel classification applied on well log images. In some embodiments, a well log image may be an "unrolled" view of the borehole as captured by one or more scopes or other imaging techniques and image processing techniques, such as edge detection, may be used to detect sinusoidal strata, locate horizons, and correct for well deviations. A variety of techniques may be used for stratigraphic layer detection from well log images. For example, stick plots may be used to show dips of all structures subdivided into sets with borehole deviations, tadpole plots show fracture orientation parameters (depth, dip, and azimuth), stereonet rose diagrams enable counting of angles between poles and rotation of poles, stratigraphic thickness plots showing layer thickness normal to the bedding, etc. Feature extraction 24 may also extract features from seismic data 62, such as a seismic cube (a three dimensional set of seismic data from which two dimensional panels may be selected). For example, seismic data 62 may be processed using the lithology, sonic logs velocity, density logs, acoustic impedance, reflection coefficients, and seismic wavelet across a plurality of seismic wave records to detect spikes corresponding to horizons. In some embodiments, feature extraction 24 may process seismic data 62 to produce or modify trace data 66 related to features detected in a larger portion of seismic data 62. Extracted features may include any parameter or combination of parameters suggestive of a horizon between layers. Feature extraction 24 may generate a plurality of features from the well log data and a plurality of features from seismic data 62. In some embodiments, feature extraction 24 may include a plurality of image processing algorithms and related processes and workflows for extracting features from both well log data 64 and seismic data 62 and feature extraction 24 may use machine learning algorithms 50 and stratigraphic knowledge base 52 to automatically analyze reservoir data source 60 or some subset thereof to select a particular set of extraction methods to use.

Feature matching 26 may operate on the features extracted from well log data 64 and seismic data 62 and attempt to match a pattern of features across the two data sets. For example, the features in seismic image representations can be correlated with the features in well log data 64 using machine learning. For example, textural descriptions or convolutional neural networks can be used to process the possible correlations until a best fit is found among a number of common features. Feature matching 26 may use prior patterns from historical stratigraphic layer interpretations stored in stratigraphic knowledge base 52 and processed through machine learning algorithms 50 to determine a best fit between the two feature sets. In some embodiments, feature matching 26 may include a plurality of image processing algorithms and related processes and workflows for matching features between well log features and seismic features and feature extraction 24 may use machine learning algorithms 50 and stratigraphic knowledge base 52 to automatically analyze reservoir data source 60 or some subset thereof to select a particular set of matching methods to use.

Layer propagation 28 may use the pattern of matched features between well log data 64 and seismic data 62 to systematically identify the layers across the entire seismic image or a portion thereof. For example, the stratigraphic layers from the seismic data 62 adjacent the well may serve as a starting point for a moving window based on panels, slices, or columns that calculates best fit from the next set of seismic data 62 to the pattern found in the prior set of seismic data 62. In some embodiments, layer propagation 28 may propagate the feature pattern using probabilistic data fit or application of similar image processing algorithms used for the original pattern match. For example, a moving window data fit from matched well log and overlapping seismic data may be propagated along the horizons in trace data 66 using a moving window with a best fit matching algorithm. In some embodiments, machine learning algorithms 50 and stratigraphic knowledge base 52 may enable more complex analysis of likely changes in the feature pattern as it is propagated away from the well data source. For example, stratigraphic interpretations from historic reservoirs having similar geological features may provide improved models for propagating and modifying the features of the well-based pattern. In some embodiments, layer propagation 28 may include a plurality of image processing algorithms and related processes and workflows for modeling changes in the well-based pattern as it moves away from the source of well log data 64 and layer propagation 28 may use machine learning algorithms 50 and stratigraphic knowledge base 52 to automatically analyze reservoir data 60 or some subset thereof to select a particular layer propagation model for use with the seismic data 62. In some embodiments, the output of layer propagation 28 may be one or more complete stratigraphic layer interpretations 70.

In some embodiments, reasoning module 30 may provide one or more numerical and/or narrative explanations that include the reasoning for stratigraphic layer interpretations 70 as associated with the algorithms, processes, and models selected and/or used by feature extraction 24, feature matching 26, and/or layer propagation 28. As various features are extracted, matched, and/or propagated, those features and related algorithms, processes, and models may be indexed to a lookup table for assembling a reasoning support output, such as a document, file, or display for user review and documented support of a given stratigraphic layer interpretation. In some embodiments, stratigraphic knowledge base 52 may include one or more sources for reasoning explanations for use by reasoning module 30 in assembling reasoning support output. For example, reasoning module 30 may process a list of features and historical stratigraphic layer interpretations from stratigraphic knowledge base 52 that were used by machine learning algorithms 50 in a particular case to extract reasoning explanations from the historic stratigraphic layer interpretations and documentation of the machine learning algorithms used. In some embodiments, reasoning module 30 produces an explanation of similarities between historical stratigraphic layer interpretations and the current stratigraphic layer interpretation using the machine learning algorithms 50 for storage and/or display to a user.

In some embodiments, interpretation interface 32 provides a user interface for an expert user to visualize, modify, select, and otherwise control the output of stratigraphic classifier 22. For example, interpretation interface 32 may include a graphical user interface displayed through computing system 10 as part of an application or module embodying stratigraphic layer identification 20. Interpretation interface 32 may include reservoir data input selection 34 that receives a user selection of a set of reservoir data available in reservoir data 60 for a particular interpretation. For example, the user may be provided with a file manager, menu of available inputs, or other navigation/selection interface from which to select the set of reservoir data relevant to the present interpretation. Interpretation interface 32 may include model/process selection 36 that receives a user selection of one or more stratigraphic models, machine learning algorithms, or other processes for use by stratigraphic classifier 22 in generating one or more stratigraphic layer interpretations 70. For example, machine learning algorithms 50 and stratigraphic knowledge base 52 may include a plurality of models and processes based on different assumptions regarding the reservoir under study and comparisons to historical and theoretical data and model/process selection 36 may enable the user to guide the selection of those models and processes, including results of various calculations and templates, using their expertise and judgement. Interpretation interface 32 may include visualizer control 38 that enables a user to navigate one or more visualizations of stratigraphic layer interpretations 70 and/or underlying reservoir data 60. For example, visualizer control 38 may include a two dimensional (2D) or three dimensional (3D) window for displaying and navigating a color-coded and/or annotated representation stratigraphic layer interpretations 70, with features like panning, zooming, rotation, displaying/hiding features/annotations, and selection of 2D slices from a 3D data set. Interpretation interface 32 may include calculate interpretation 40 that enables the user to initiate or recalculate stratigraphic layer interpretations 70 based on selections made with reservoir data input selection 34 and model/process selection 36. For example, calculate interpretation 40 may include a button, menu options, or other selection method for initiating one or more processes of stratigraphic classifier 22 using a selected set of data from reservoir data 60 and/or models and processes from machine learning algorithms 50 and stratigraphic knowledge base 52. Interpretation interface 32 may include user correction 42 that enables the user to make corrections to data, calculations, and/or stratigraphic features in stratigraphic layer interpretations 70. For example, user correction 42 may allow the user to remove, shift, connect, or otherwise modify stratigraphic features generated by stratigraphic classifier 22 through visualizer control 38 or another interface for providing corrections. Interpretation interface 32 may include register interpretation 44 that enables the user to select a particular interpretation from stratigraphic layer interpretations 70 as the validated interpretation for use in related reservoir management decisions or to drive other processes or projects related to reservoir data 60. For example, register interpretation 44 may include a button, menu option, or other selection method for initiating one or more processes for storing, logging, or outputting the current or selected stratigraphic layer interpretation for use by other systems (and/or reuse by stratigraphic layer identification 20).

In some embodiments, stratigraphic layer identification 20 includes knowledge base manager 46. Knowledge base manager 46 may enable a user to add, remove, or otherwise manage the contents of stratigraphic knowledge base 52. For example, knowledge base manager 46 may include one or more navigation interfaces, such as a file manager, index, or data map, for viewing the contents of knowledge base manager 46 and enabling one or more management functions, such as addition or classification of content. In some embodiments, knowledge base manager 46 may interact with register interpretation 44 and log the validated stratigraphic layer interpretation in stratigraphic knowledge base 52 for use by machine learning algorithms 50.

Figure 2:
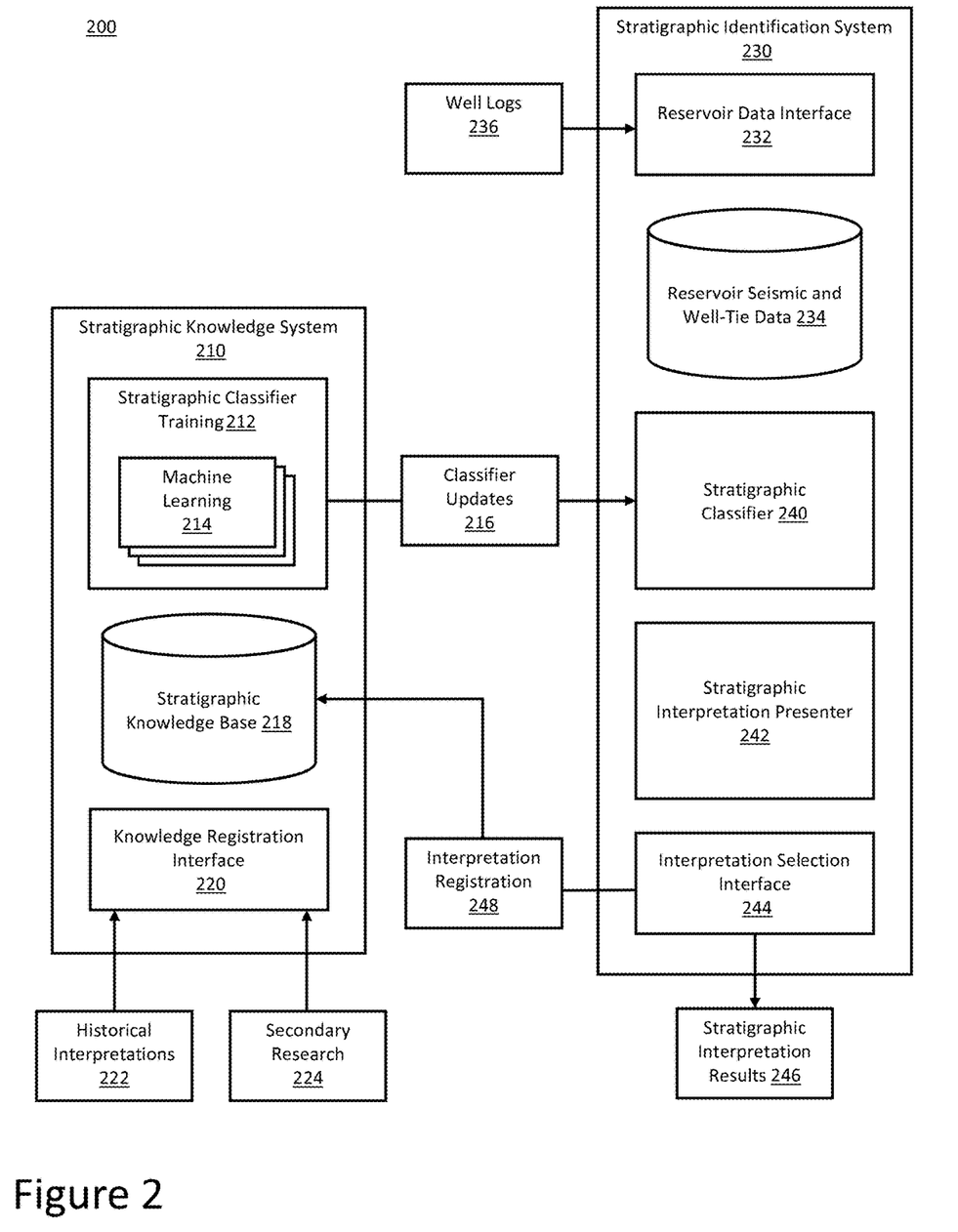
FIG. 2 shows another example stratigraphic layer identification system according to embodiments.

Referring to FIG. 2, an example stratigraphic layer identification system 200 is shown, such as may be implemented on one or more computers similar to computing system 10. Stratigraphic layer identification system 200 may be comprised of a stratigraphic knowledge system 210 and a stratigraphic identification system 230. In some embodiments, stratigraphic knowledge system 210 may be embodied in a cloud computing, network storage, or similar environment for multi-user access to a shared resource and stratigraphic identification system 230 may be embodied in an end user application on an end user computing system or accessed through an end user computing device as a hosted software service. In some embodiments, stratigraphic knowledge system 210 and stratigraphic identification system 230 may be hosted by a common computing system or distributed across any number of computing systems.

Stratigraphic knowledge system 210 may embody features and functions similar to knowledge base manager 46, machine learning algorithms 50, and stratigraphic knowledge base 52 described with regard to FIG. 1. Stratigraphic knowledge system 210 may include stratigraphic classifier training 212 that uses machine learning algorithms 214 to iteratively improve one or more stratigraphic classification models, processes, calculations, and/or templates. For example, stratigraphic classifier training 212 may be initiated periodically or on an event basis (such as the registration of new knowledge records in stratigraphic knowledge base 218) to update or recalculate one or more machine learning algorithms 214 to change decision-making weights or factors for one or more calculations used in feature extraction, feature matching, layer propagation, and/or reasoning support for a stratigraphic classifier, such as stratigraphic classifier 240. Classifier updates 216 generated by stratigraphic classifier training 212 may be communicated to stratigraphic identification system 230 for use by stratigraphic classifier 240 on a periodic or event basis. In some embodiments, stratigraphic classifier 240 may query stratigraphic classifier training 212 for relevant classifier updates 216 prior to running a new stratigraphic layer interpretation. Stratigraphic classifier training 212 may use stratigraphic knowledge base 218 as a data source for machine learning algorithms 214. In some embodiments, calculations from machine learning algorithms 214, such as decision weighting and factors for one or more terms may be stored in stratigraphic knowledge base 218 for iterative calculations. Stratigraphic knowledge base 218 may receive new data through knowledge registration interface 220 and/or validated stratigraphic layer interpretations from stratigraphic identification system 230, such as interpretation registration 248. Knowledge registration interface 220 may include one or more channels for receiving new data records and updates thereto relevant to stratigraphic layer interpretation or the state-of-the-art in reservoir data modeling, interpretation, and related reservoir management decisions. For example, knowledge registration interface 220 may receive historical interpretations 222, such as the proprietary and/or public data regarding prior stratigraphic data analysis, stratigraphic feature interpretations, and related validations and/or reservoir management outcomes. As another example, knowledge registration interface 220 may receive secondary research 224 relevant to stratigraphic data analysis, such as proprietary, academic, or industry research into reservoir data modeling, feature extraction, and statistical analysis of reservoir data and reservoir management outcomes. In some embodiments, historical interpretations 222 and/or secondary research 224 may be provided and maintained through a data exchange interface or API with one or more relevant data repositories, such as industry or academic publications or databases, and may include queries, filtering, parsing, classification, and/or other processes for organizing stratigraphic knowledge base 218 for use with machine learning algorithms 214. In some embodiments, knowledge registration interface 220 may include a graphical user interface and enable one or more users to curate the addition, removal, and organization of data records within stratigraphic knowledge base 218.

Stratigraphic identification system 230 may include a reservoir data interface 232 that enables a user to select one or more reservoir data sets to use for generating stratigraphic layer interpretations. For example, reservoir data interface 232 may provide access to reservoir seismic and well tie data 234 and/or may receive or access external data sources, such as well logs 236. In some embodiments, reservoir data interface 232 may be embodied in a graphical user interface similar to interpretation interface 32 and reservoir data input selection 34 described with regard to FIG. 1. Stratigraphic identification system 230 may also include stratigraphic classifier 240 that processes reservoir data, such as reservoir seismic and well tie data 234 to generate one or more stratigraphic layer interpretations. For example, stratigraphic classifier 240 may process selected reservoir data using a model, process, calculation, or template based on machine learning algorithms 214 to extract features, match them, and propagate them across the data set to classify the various features into a stratigraphic layer interpretation. In some embodiments, stratigraphic classifier 240 may operate similarly to stratigraphic classifier 22 described with regard to FIG. 1. Stratigraphic classifier 240 may receive classifier updates 216 on a periodic and/or event basis or upon request in order to update the models, processes, calculations, or templates used for generating the stratigraphic layer interpretation. Stratigraphic identification system 230 may also include a stratigraphic interpretation presenter 242 for visualizing the stratigraphic layer interpretation to a user and enable review and other interactions with the stratigraphic layer interpretation and related data and reasoning. For example, stratigraphic interpretation presenter 242 may include a graphical user interface that presents 2D and/or 3D image data based on the stratigraphic layer interpretation and may enable navigation and correction of the stratigraphic layer interpretation. Stratigraphic identification system 230 may also include interpretation selection interface 244 for enabling a user to select a valid stratigraphic layer interpretation based on their expert evaluation of the presented features and/or reasoning from stratigraphic interpretation presenter 242. For example, the user may use a button, menu, or other selector provided interpretation selection interface 244 for selecting a presented stratigraphic layer interpretation. Interpretation selection interface 244 may generate stratigraphic interpretation results 246 for output, display, storage, and/or use by other systems or processes. Interpretation selection interface 244 may also generate interpretation registration 248 to communicate the validated stratigraphic layer interpretation to stratigraphic knowledge system 210 for inclusion in stratigraphic knowledge base 218. In some embodiments, stratigraphic interpretation presenter 242 and interpretation selection interface 244 may be embodied in a graphical user interface similar to interpretation interface 32 described with regard to FIG. 1.

Figure 3:
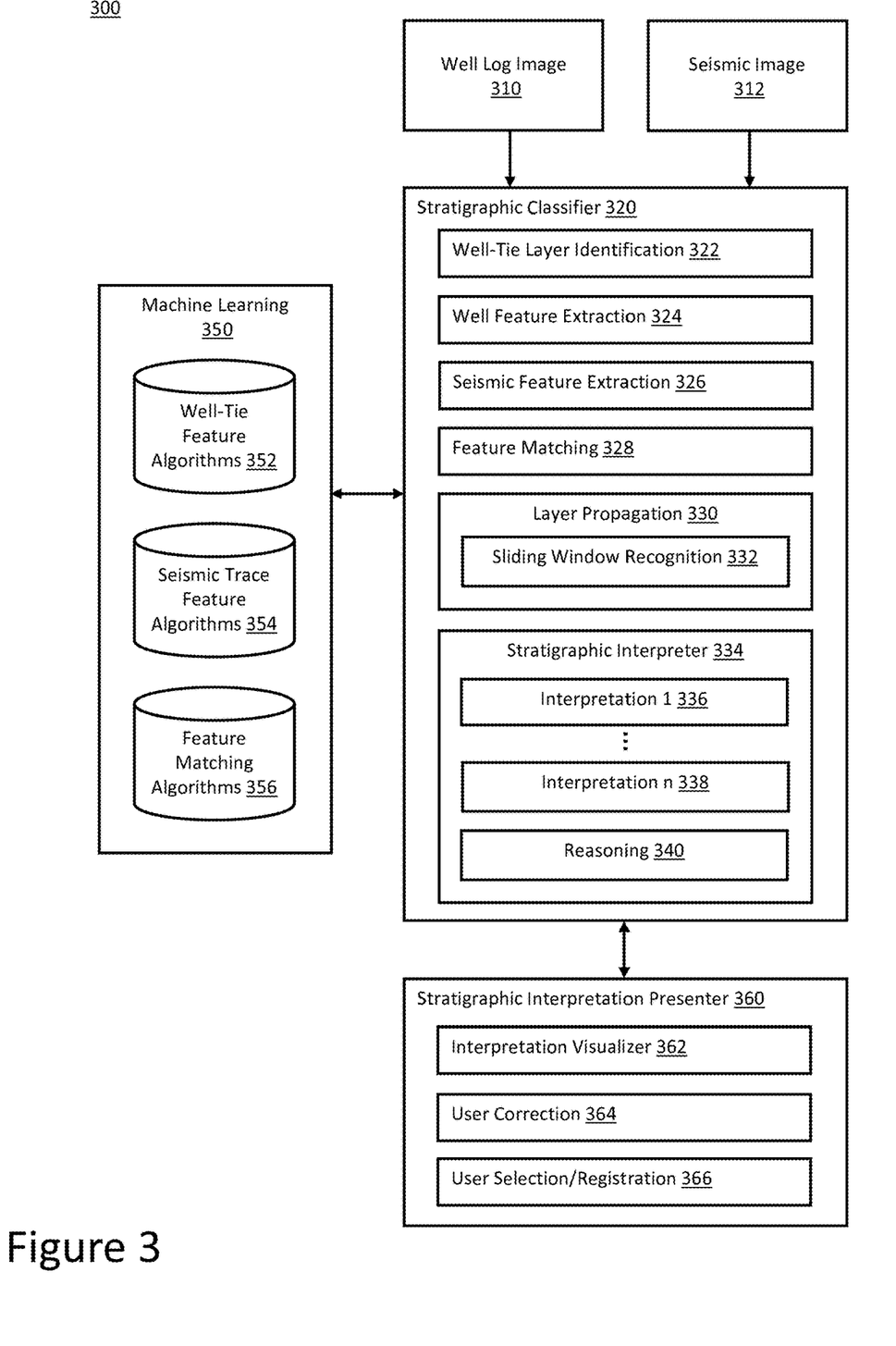
FIG. 3 shows an example stratigraphic layer identification application according to embodiments.

Referring to FIG. 3, an example stratigraphic layer identification application 300 is shown, such as may be embodied in program code running on a computer, such as computing system 10 in FIG. 1. At least one well log image 310 and at least one seismic image 312 are provided as input to stratigraphic classifier 320. Stratigraphic classifier 320 may include well-tie layer identification 322. For example, well-tie layer identification 322 may include an automated image processing process for identifying layer features from well log image 310 or may provide a suite of tools for assisting an expert user in identifying layer features to create a set of well-tie layer data. Stratigraphic classifier 320 may include well feature extraction 324 that extracts and normalizes layer features from well-tie data for comparison against overlapping and/or adjacent seismic data. For example, well feature extraction 324 may include calculations for normalizing to an origin for the well, correcting for well deviation, and identifying well-tie layer data corresponding most strongly to layering horizons. Stratigraphic classifier 320 may include seismic feature extraction 326 that extracts and normalizes layer features from seismic data for comparison to overlapping or adjacent well-tie layer data and propagating layer features across the seismic data set. For example, seismic feature extraction 326 may use image processing algorithms and/or seismic trace algorithms to calculate the likelihood of a given pattern of seismic data corresponding to a layer feature and extracting providing a layer profile for a given column of seismic data. Stratigraphic classifier 320 may include feature matching 328 that compares well log features to adjacent or overlapping seismic features. For example, feature matching 328 may compare the feature profile of the column of well-tie layer data to the feature profile of the column of seismic data using a best fit comparison algorithm that may shift, stretch, and compress one feature profile to identify continuous layer features across the two feature profiles.

Stratigraphic classifier 320 may include layer propagation 330 that includes sliding window recognition 332 for propagating matched layer features across the seismic data set by comparison to previously matched data. For example, once a high correlation of features is found between the well-tie layer data and the overlapping or immediately adjacent column of seismic layer data, that column of seismic layer data may be substituted for the well-tie layer data to match with one or more columns of seismic data adjacent the first column. In this way, the window of comparison may slide outward from the well site. In some embodiments, the sliding window and comparison algorithms may simultaneously analyze more than a single column of data and may integrate other factors for finding the most likely paths of layer propagation across the seismic data set.

Stratigraphic classifier 320 may include a stratigraphic interpreter 334 that assembles and validates the completeness and rationality of the propagated features across the seismic data set of interest to generate at least stratigraphic interpretation 336. For example, stratigraphic interpreter 334 may receive a prompt from layer propagation 330 that identifies that all seismic data in the data set has been processed (or proactively excluded). In some embodiments, stratigraphic interpreter 334 may include additional rules, in addition to completion of feature propagation, for evaluating interpretation 336, such as whether there are inconsistencies in layer features where well-tie data from multiple wells are present in the same seismic data set, or whether any know geological features or principles are violated by the interpretation. In some embodiments, stratigraphic classifier 320 may process a given set of well log and seismic data multiple times using different models, processes, calculations, and/or templates for well feature extraction 324, seismic feature extraction 326, feature matching 328, and/or layer propagation 330, resulting in multiple interpretations (1-$n$) 336, 338. For example, a user may be able to select on or more models, processes, calculations, and/or templates from a user interface and change those selections in iterative attempts to generate a valid stratigraphic layer interpretation. In some embodiments, stratigraphic interpreter 334 may include reasoning 340 to provide descriptive annotations of the features and the assumptions, models, processes, calculations, and/or templates used to generate interpretation 336.

In some embodiments, machine learning algorithms 350 may be used to select among a plurality of well-tie feature algorithms 352, seismic trace feature algorithms 354, and/or feature matching algorithms 356 for generating interpretations (1-$n$) 336, 338. For example, a stratigraphic knowledge system may provide machine learning 350 based on one or more stratigraphic knowledge bases. In some embodiments, machine learning 350 may be used to automatically generate a plurality of interpretations (1-$n$) 336, 338 based on varying assumptions, models, processes, calculations, and/or templates and evaluate and rank interpretations (1-$n$) 336, 338 for review and validation by a user. Reasoning 340 may provide separate reasoning entries for each of the plurality of interpretations (1-$n$) to assist the user in reviewing and validating one or more interpretations.

In some embodiments, stratigraphic classifier 320 may interact with stratigraphic interpretation presenter 360 to assist a user with reviewing and validating stratigraphic layer interpretations. Stratigraphic interpretation presenter 360 may include interpretation visualizer 362 for visualizing a stratigraphic layer interpretation using 2D and/or 3D image data in a graphical user interface. Stratigraphic interpretation presenter 360 may include user correction 364 that provides tools for modifying the stratigraphic layer interpretation being visualized. Stratigraphic interpretation presenter 360 may include user selection/registration 366 that enables a user to select an interpretation from the plurality of interpretations (1-$n$) 336, 338 as valid and to be used for additional processes, including but not limited to registration in a relevant stratigraphic knowledge base.

Figure 4:
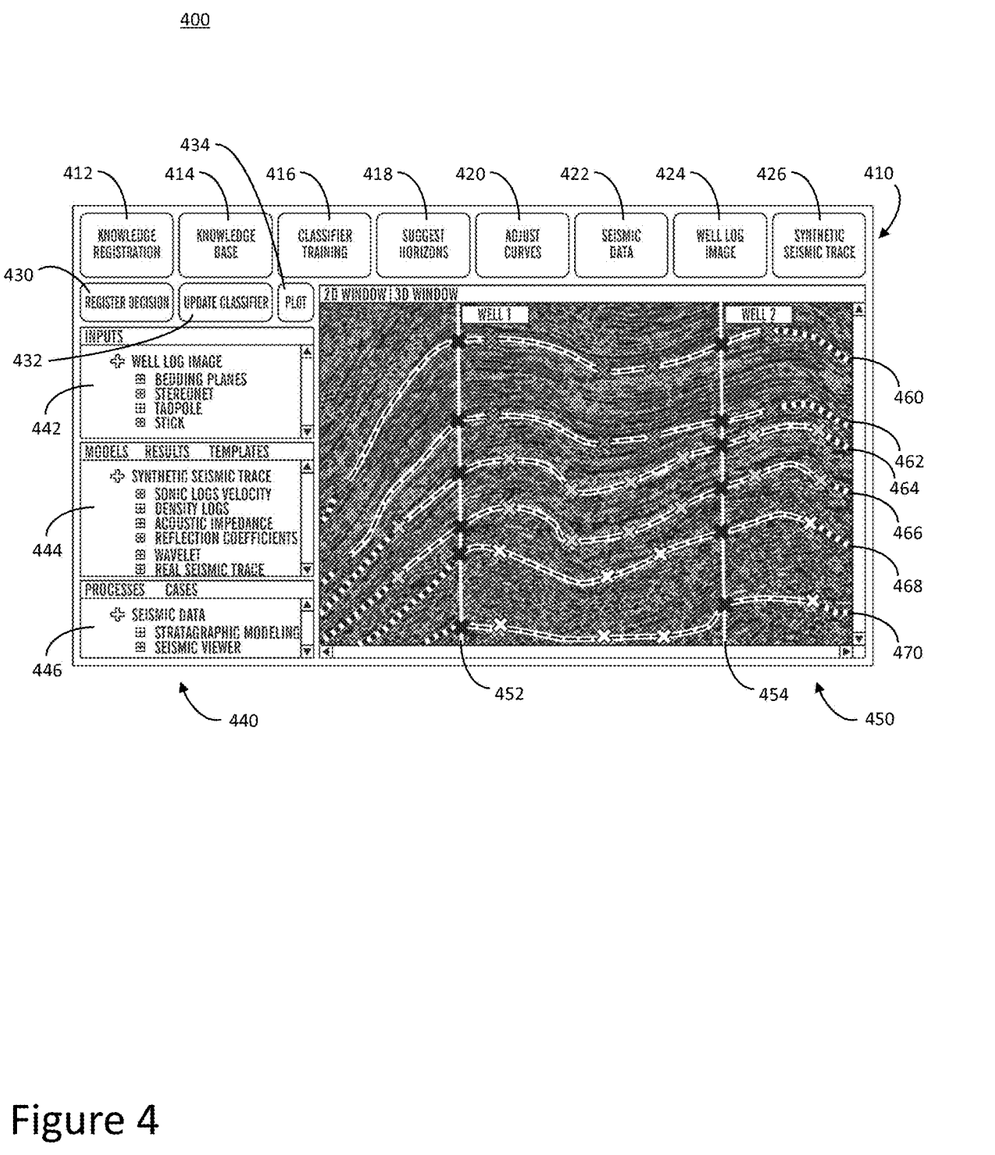
FIG. 4 shows an example user interface for a stratigraphic layer identification system according to embodiments.

Referring to FIG. 4, a graphical user interface 400 for a stratigraphic layer identification system, such as the stratigraphic layer identification systems of FIGS. 1-3. For example, graphical user interface 400 may be displayed through and navigable by one or more I/O devices of a computing system to interact with a stratigraphic layer identification application running on or accessible through the computing system.

Graphical user interface 400 may provide a menu of functions 410 for interacting with reservoir data, one or more stratigraphic knowledge bases, and a stratigraphic classifier for generating stratigraphic feature interpretations. Menu of functions 410 may include knowledge registration button 412 that initiates an interface for adding data to a stratigraphic knowledge base, including registering new stratigraphic knowledge records. For example, knowledge registration button 412 may initiate a knowledge registration interface, such as knowledge registration interface 220 in FIG. 2, or a knowledge registration sub-function of a knowledge base manager, such as knowledge base manager 46 in FIG. 1. Menu of functions 410 may include knowledge base button 414 that initiates a knowledge base management interface for reviewing, navigating, modifying, and/or otherwise managing one or more related knowledge bases. For example, knowledge base button 414 may initiate a knowledge base manager function, such as knowledge base manager 46 in FIG. 1. Menu of functions 410 may include classifier training button 416 that initiates a classifier training interface for managing one or more machine learning algorithms available for the stratigraphic classifier functions, including the selection and modification of available algorithms, factors, and training data sets. For example, classifier training button 416 may initiate a stratigraphic classifier training function, such as stratigraphic classifier training 212 in FIG. 2, or otherwise enable management of machine learning algorithms, such as machine learning algorithms 50 in FIG. 1, machine learning algorithms 214 in FIG. 2, or machine learning algorithms 350 in FIG. 3. Menu of functions 410 may include suggest horizons button 418 that initiates feature extraction, matching, and propagation to generate a stratigraphic layer interpretation using a stratigraphic classifier based on machine learning. For example, suggest horizons button 418 may initiate a stratigraphic classifier to automatically proceed through feature extraction from seismic and well-log data, feature matching between seismic and well-log data, and layer propagation across the seismic data, such described for stratigraphic classifier 22 and calculate interpretation 40 in FIG. 1, stratigraphic classifier 240 in FIG. 2, or stratigraphic classifier 320 in FIG. 3. Menu of functions 410 may include adjust curves button 420 that initiates user controls for modifying or correcting selected feature curves generated by the stratigraphic classifier. For example, adjust curves button 420 may enable correction of the stratigraphic feature interpretation provided by the stratigraphic classifier and visualized (in visualization window 450) using one or more correction functions, such as user correction 42 in FIG. 1 and user correction 364 in FIG. 3. Menu of functions 410 may include seismic data button 422, well log image button 424, and synthetic seismic trace button 426 for managing selection and review of seismic data, well log data, and trace data. For example, seismic data button 422, well log image button 424, and seismic trace button 426 may provide user access and selection of reservoir data, such as seismic data 62, well log data 64, and trace data 66 in FIG. 1, well logs 236 and reservoir seismic and well-tie data 234 in FIG. 2, and well log image 310 and seismic image 312 in FIG. 3. Menu of functions 410 may include register decision button 430 that enables a user to validate a stratigraphic layer interpretation and submit it for further use. For example, register decision button 430 may initiate a function for registering a valid stratigraphic layer interpretation, such as register interpretation 44 in FIG. 1, interpretation selection interface 244 in FIG. 2, and user selection/registration 366 in FIG. 3. Menu of functions 410 may include may include update classifier button 432 that updates the seismic classifier, generally based on registration of a new stratigraphic layer interpretation or other stratigraphic knowledge registration. For example, update classifier button 432 may initiate similar processes to classifier training button 416 or a sub-process thereof. Menu of functions 410 may include a plot button 434 that initiates the visualization window 450 based on selected and/or generated or corrected seismic data, well log data, trace data, and stratigraphic feature interpretations generated by the stratigraphic classifier. For example, plot button 434 may initiate an interpretation visualizer, such as visualizer control 38 in interpretation interface 32 in FIG. 1, stratigraphic interpretation presenter 242 in FIG. 2, and interpretation visualizer 362 in stratigraphic interpretation presenter 360 in FIG. 3.

Graphical user interface 400 may provide a selection interface 440 for selecting the inputs, models, results, templates, processes, and cases used by the stratigraphic classifier for generating stratigraphic feature interpretations. For example, inputs menu 442 may provide a selection of data inputs, such as various well log images and calculations therefrom, including bedding planes, stereonet, tadpole, and stick diagrams from a selected well log. For example, a models results templates menu 444 may provide a selection of seismic trace or other feature extraction models or calculations, such as sonic logs velocity, density logs, acoustic impedance, reflection coefficients, wavelet, and real seismic trace. For example, a processes cases menu 446 may provide a selection of processes and tools for propagating features through seismic data, such as stratigraphic modeling and seismic viewer.

Graphical user interface 400 may include visualization window 450 for presenting one or more views of reservoir data and stratigraphic layer interpretations generated by the stratigraphic classifier to the user. For example, visualization window 450 may support 2D and 3D rendering and navigation of image data, including well log image data, seismic data, seismic trace data, and stratigraphic layer interpretation data. In some embodiments, visualization window 450 may display seismic data for a reservoir area and well log data for at least one well. An example visualization of a stratigraphic layer interpretation is shown in visualization window 450 of FIG. 4. For example, wells 452, 454 may be depicted as vertical lines with x's denoting layer features extracted from well log data. A plurality of horizon lines 460, 462, 464, 466, 468, 470 may depict layer horizons propagated through the background seismic image data and may include a plurality of notations corresponding to seismic trace data, extracted seismic trace features, and seismic trace horizons correlated through feature match propagation from the well locations. The representation shown in visualization window 450 is provided as an example of stratigraphic layer interpretation visualization and a variety of image representations, overlays, annotations, and navigational features relevant to stratigraphic data modeling may be employed.

Figure 5:
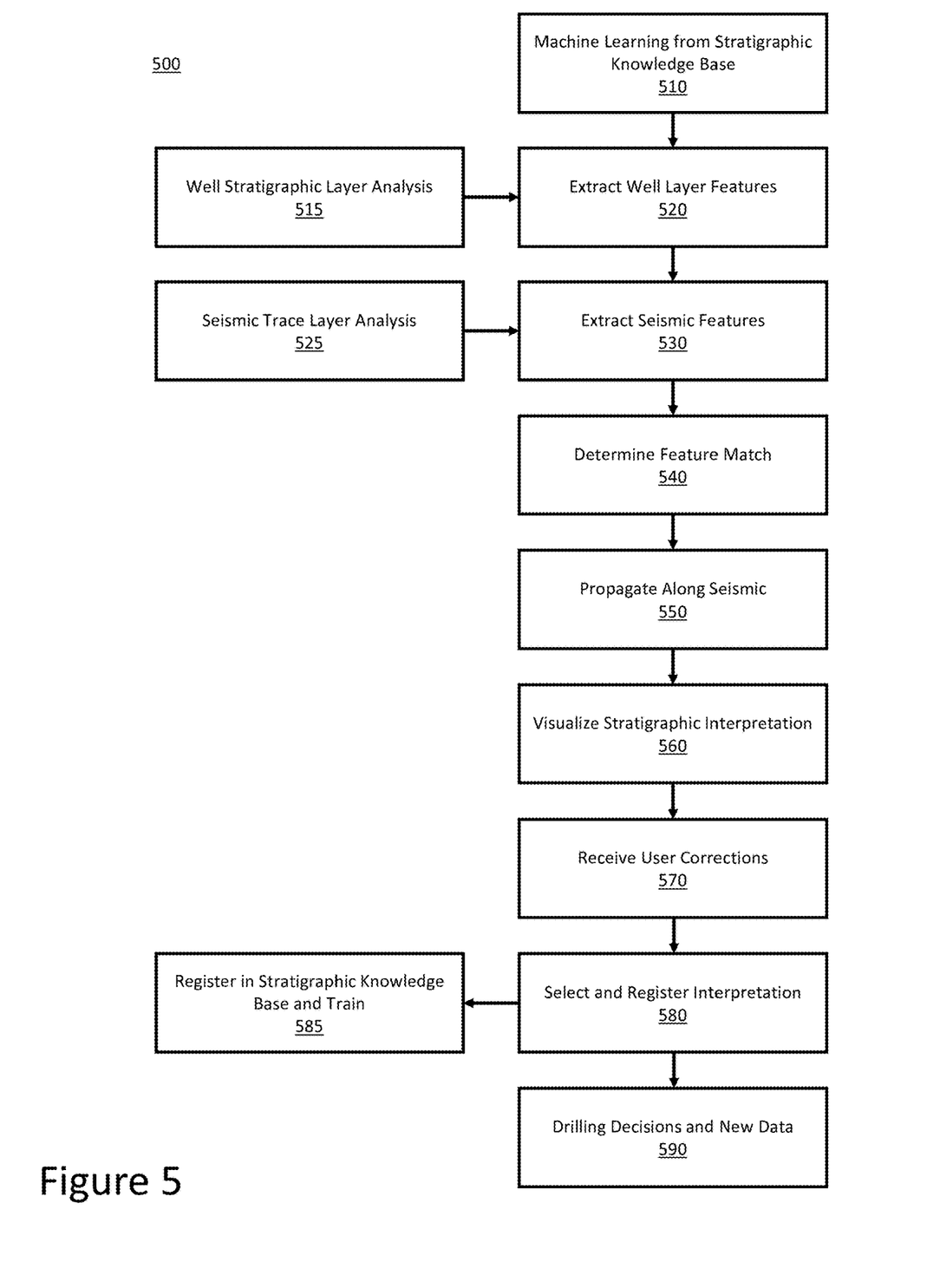
FIG. 5 shows an example method of stratigraphic layer identification according to embodiments.

Referring to FIG. 5, an example computerized method 500 of stratigraphic layer identification is shown. In some embodiments, method 500 may be implemented in computing environments, systems, applications, and interfaces similar to those described with regard to FIGS. 1-4. In some embodiments, the processes of method 500 may be embodied in program code and/or hardware functional modules executing the processes described below. In process 510, machine learning algorithms may be used to generate automated feature extraction, matching, and propagation models, processes, and templates from a stratigraphic knowledge base to train a stratigraphic classifier. In process 515, well-tie stratigraphic layers may be identified from analysis of well log data, such as well log images, using a stratigraphic classifier or some other method or tool. In process 520, well-tie layer features may be extracted from the well log data using models, processes, or templates from process 510. In process 525, seismic trace layers may be identified from analysis of seismic data using a stratigraphic classifier or some other method or tool. In process 530, seismic layer features may be extracted from the seismic data using models, processes, or templates from process 510. In process 540, matches between well-tie layer features and seismic layer features in overlapping or adjacent locations may be determined using models, processes, or templates from process 510. In process 550, feature matches from process 540 may be propagated along seismic trace data to generate layer horizons around or between well locations using models, processes, or templates from process 510. In process 560, a resulting stratigraphic layer interpretation of the well log, seismic, and seismic trace data may be visualized in a user interface for review, correction, and validation. In process 570, user corrections to one or more features of the generated stratigraphic layer interpretation may be received from a user. In process 580, a stratigraphic layer interpretation may be selected and registered based on user input as a validated interpretation. In process 585, the validated stratigraphic layer interpretation is registered in the stratigraphic knowledge base and machine learning algorithms are used to further train the stratigraphic classifier. In process 590, additional processing, drilling decisions, and generation of additional well log, seismic, and reservoir management data may be generated based on the stratigraphic layer interpretation.

It is understood that stratigraphic layer identification system 20 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 18. In general, processor(s) 12 execute program code which is at least partially fixed in memory 16. While executing program code, processor(s) 12 can process data, which can result in reading and/or writing transformed data from/to memory and/or I/O 14 for further processing. The pathway 18 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the stratigraphic layer identification system 20 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system for stratigraphic layer identification, the computer system comprising:
   one or more computer processors;
   one or more computer readable storage devices; and
   program instructions stored on at least one of the one or more computer readable storage devices for execution by at least one of the one or more computer processors, the program instructions comprising:
   program instructions to access seismic data for a reservoir area and well log data for at least one well in the reservoir area;
   program instructions to identify a plurality of well stratigraphic layer features utilizing at least a portion of the well log data;
   program instructions to identify a plurality of seismic stratigraphic layer features utilizing at least a portion of the seismic data;
   program instructions to match the plurality of well stratigraphic layer features to the plurality of seismic stratigraphic layer features by selecting a feature matching algorithm from a plurality of feature matching algorithms based on a stratigraphic knowledge base;
   program instructions to define a stratigraphic layer interpretation for the reservoir area utilizing the plurality of well stratigraphic layer features matched to the plurality of seismic stratigraphic layer features;
   program instructions to register the stratigraphic layer interpretation in the stratigraphic knowledge base, wherein the stratigraphic knowledge base includes at least one machine learning algorithm for integrating the stratigraphic layer interpretation into selection criteria for the plurality of feature matching algorithms, and wherein the stratigraphic layer interpretation is a visual map defining the locations of a plurality of horizons between strata having varying characteristics within a geological volume; and
   program instructions to present a visualization of the stratigraphic layer interpretation to a user.

2. The computer system of claim 1, further comprising:
   program instructions to select a well-tie feature algorithm from a plurality of well-tie feature algorithms based on the stratigraphic knowledge base using at least one machine learning algorithm; and
   program instructions to identify the plurality of well stratigraphic layer features utilizing the selected well-tie feature algorithm.

3. The computer system of claim 1, further comprising:
   program instructions to select a seismic trace feature algorithm from a plurality of seismic trace feature algorithms based on the stratigraphic knowledge base using at least one machine learning algorithm; and
   program instructions to identify the plurality of seismic stratigraphic layer features utilizing the selected seismic trace feature algorithm.

4. The computer system of claim 1, further comprising:
   program instructions to select the feature matching algorithm from the plurality of feature matching algorithms using at least one machine learning algorithm and historical stratigraphic layer interpretations.

5. The computer system of claim 1, further comprising:
   program instructions to define at least one stratigraphic horizon using a sliding window to compare at least one matched well stratigraphic layer feature and seismic stratigraphic layer feature at a first layer of a geological volume originating at the at least one well to a seismic stratigraphic layer feature at an overlapping layer in the geographic volume to create the stratigraphic layer interpretation for the reservoir area utilizing the plurality of well stratigraphic layer features matched to the plurality of seismic stratigraphic layer features.

6. The computer system of claim 1, further comprising:
   program instructions to access a reservoir data source that includes a plurality of well logs for a plurality of wells at a plurality of well locations in the reservoir area;
   program instructions to identify the plurality of well stratigraphic layer features for each of the plurality of well locations utilizing a well feature extraction module;
   program instructions to identify the plurality of seismic layer features for each of the plurality of well locations utilizing a seismic feature extraction module;
   program instructions to match at least a portion of the plurality of well stratigraphic layer features to a portion of the plurality of seismic stratigraphic layer features at each of the plurality of well locations utilizing a feature matching module; and
   program instructions to define the stratigraphic layer interpretation between each of the plurality of well locations utilizing a layer propagation module.

7. The computer system of claim 1, further comprising:
   program instructions to modify the stratigraphic layer interpretation utilizing an interpretation interface that includes a user correction module and an interpretation visualizer.

8. The computer system of claim 1, further comprising:
   program instructions to compare the seismic data and well log data to historical stratigraphic layer interpretations in the stratigraphic knowledge base to select and use a machine learning algorithm.

9. The computer system of claim 7, further comprising:
   program instructions to display an explanation of similarities between historical stratigraphic layer interpretations and the stratigraphic layer interpretation using the machine learning algorithm utilizing the interpretation interface.

10. A computer program product stored on a computer readable storage medium, which when executed by a computing system, provides for stratigraphic layer identification, the computer program product comprising:
    program code that accesses seismic data for a reservoir area and well log data for at least one well in the reservoir area;
    program code that identifies a plurality of well stratigraphic layer features utilizing at least a portion of the well log data;
    program code that identifies a plurality of seismic stratigraphic layer features utilizing at least a portion of the seismic data;

program code that matches the plurality of well stratigraphic layer features to the plurality of seismic stratigraphic layer features by selecting a feature matching algorithm from a plurality of feature matching algorithms based on a stratigraphic knowledge base;

program code that defines a stratigraphic layer interpretation for the reservoir area utilizing the plurality of well stratigraphic layer features matched to the plurality of seismic stratigraphic layer features;

program code that registers the stratigraphic layer interpretation in the stratigraphic knowledge base, wherein the stratigraphic knowledge base includes at least one machine learning algorithm for integrating the stratigraphic layer interpretation into selection criteria for the plurality of feature matching algorithms, and wherein the stratigraphic layer interpretation is a visual map defining the locations of a plurality of horizons between strata having varying characteristics within a geological volume; and program code that presents a visualization of the stratigraphic layer interpretation to a user.

11. The computer program product of claim 10, further comprising:

program code that selects a well-tie feature algorithm from a plurality of well-tie feature algorithms based on the stratigraphic knowledge base using at least one machine learning algorithm, the selected well-tie feature algorithm being used to identify the plurality of well stratigraphic layer features.

12. The computer program product of claim 10, further comprising:

program code that selects a seismic trace feature algorithm from a plurality of seismic trace feature algorithms based on the stratigraphic knowledge base using at least one machine learning algorithm, the selected seismic trace feature algorithm being used to identify the plurality of seismic stratigraphic layer features.

13. The computer program product of claim 10, further comprising:

program code that selects the feature matching algorithm from the plurality of feature matching algorithms using at least one machine learning algorithm and historical stratigraphic layer interpretations.

14. The computer program product of claim 10, further comprising:

program code that defines at least one stratigraphic horizon using a sliding window to compare at least one matched well stratigraphic layer feature and seismic stratigraphic layer feature at a first layer of a geological volume originating at the at least one well to a seismic stratigraphic layer feature at an overlapping layer in the geographic volume to create the stratigraphic layer interpretation for the reservoir area utilizing the plurality of well stratigraphic layer features matched to the plurality of seismic stratigraphic layer features.

15. A computerized method comprising:

accessing seismic data for a reservoir area and well log data for at least one well in the reservoir area;

identifying a plurality of well stratigraphic layer features utilizing at least a portion of the well log data;

identifying a plurality of seismic stratigraphic layer features utilizing at least a portion of the seismic data;

selecting a feature matching algorithm from a plurality of feature matching algorithms based on a stratigraphic knowledge base;

matching the plurality of well stratigraphic layer features to the plurality of seismic stratigraphic layer features;

defining a stratigraphic layer interpretation for the reservoir area by propagating one or more stratigraphic layer features from the plurality of well stratigraphic layer features matched to the plurality of seismic stratigraphic layer features;

registering the stratigraphic layer interpretation in the stratigraphic knowledge base, wherein the stratigraphic knowledge base includes at least one machine learning algorithm for integrating the stratigraphic layer interpretation into selection criteria for the plurality of feature matching algorithms, and wherein the stratigraphic layer interpretation is a visual map defining the locations of a plurality of horizons between strata having varying characteristics within a geological volume; and presenting a visualization of the stratigraphic layer interpretation to a user.

16. The computerized method of claim 15, further comprising:

receiving user corrections to the stratigraphic layer interpretation.

17. The computerized method of claim 15, further comprising:

selecting a well-tie feature algorithm from a plurality of well-tie feature algorithms based on the stratigraphic knowledge base using at least one machine learning algorithm, the selected well-tie feature algorithm being used to identify the plurality of well stratigraphic layer features; and selecting a seismic trace feature algorithm from a plurality of seismic trace feature algorithms based on the stratigraphic knowledge base using at least one machine learning algorithm, the selected seismic trace feature algorithm being used to identify the plurality of seismic stratigraphic layer features.

* * * * *